(12) United States Patent
Fayollas et al.

(10) Patent No.: US 8,317,174 B2
(45) Date of Patent: Nov. 27, 2012

(54) POSITIONING SYSTEM FOR A COMPONENT, ADJUSTMENT TOOL AND ADJUSTMENT METHOD

(75) Inventors: Philippe Fayollas, Le Bouscat (FR); François Macias, Mios (FR)

(73) Assignee: Commissariat a l'Energie (FR)

( * ) Notice: Subject to any disclaimer, the term of this patent is extended or adjusted under 35 U.S.C. 154(b) by 964 days.

(21) Appl. No.: 12/093,297

(22) PCT Filed: Nov. 8, 2006

(86) PCT No.: PCT/EP2006/068221
§ 371 (c)(1),
(2), (4) Date: May 9, 2008

(87) PCT Pub. No.: WO2007/054509
PCT Pub. Date: May 18, 2007

(65) Prior Publication Data
US 2008/0315479 A1    Dec. 25, 2008

(30) Foreign Application Priority Data
Nov. 10, 2005  (FR) ...................................... 05 53429

(51) Int. Cl.
| | |
|---|---|
| B21K 21/16 | (2006.01) |
| B23P 17/04 | (2006.01) |
| B23P 23/00 | (2006.01) |
| B23P 21/00 | (2006.01) |
| B23Q 15/00 | (2006.01) |
| B23Q 3/18 | (2006.01) |
| B23Q 3/00 | (2006.01) |
| B23Q 3/08 | (2006.01) |
| A61B 17/70 | (2006.01) |

(52) U.S. Cl. .............. 269/58; 269/310; 269/27; 29/714; 29/401.1; 606/266

(58) Field of Classification Search .................... 269/58, 269/310, 27, 714; 29/714, 401.1, 712; 606/266, 606/305, 308, 247
See application file for complete search history.

(56) References Cited

U.S. PATENT DOCUMENTS 4,390,172 A    6/1983 Gotman
(Continued)

FOREIGN PATENT DOCUMENTS

DE    3137301 A1 *    4/1983
(Continued)

OTHER PUBLICATIONS

English Translation of International Preliminary Examination Report, PCT/IPEA/338.

*Primary Examiner* — Lee D Wilson
*Assistant Examiner* — Alvin Grant
(74) *Attorney, Agent, or Firm* — Baker & Hustetler LLP

(57) ABSTRACT

System for positioning a component on a frame relative to a reference.
It comprises a ball assembly (4), composed of a rod (6), a ball (8) fixed to the rod (6) and a ball joint clamping system (10, 12) mounted on the rod to fix the ball assembly relative to the component;
a vee assembly composed of a rod (16), a vee (18) fixed to the rod (16) and a ball joint clamping system (20, 22) mounted on the rod to fix the vee assembly relative to the frame;
an elastic connecting element (26) to keep the ball (8) in contact with the vee (18).

7 Claims, 10 Drawing Sheets

U.S. PATENT DOCUMENTS

| | | | | |
|---|---|---|---|---|
| 4,586,702 A | * | 5/1986 | Chambers | 269/310 |
| 4,706,796 A | * | 11/1987 | Chambers | 198/346.1 |
| 4,813,125 A | * | 3/1989 | Dacey, Jr. | 29/714 |
| 5,082,254 A | * | 1/1992 | Hunnell et al. | 269/269 |
| 5,580,035 A | * | 12/1996 | Ffield et al. | 269/27 |
| 5,619,781 A | * | 4/1997 | Ffield et al. | 29/401.1 |
| 7,179,225 B2 | * | 2/2007 | Shluzas et al. | 600/219 |
| 7,241,070 B2 | * | 7/2007 | McMurtry | 403/128 |
| 7,568,854 B2 | * | 8/2009 | McMurtry | 403/128 |
| 7,615,068 B2 | * | 11/2009 | Timm et al. | 606/266 |
| 7,635,379 B2 | * | 12/2009 | Callahan et al. | 606/266 |
| 2008/0209790 A1 | * | 9/2008 | Bartle | 42/94 |

FOREIGN PATENT DOCUMENTS

| | | |
|---|---|---|
| DE | 88 05 356 U1 | 6/1988 |
| DE | 20 2004 020 341 U1 | 10/2004 |
| DE | 20 2004 020341 U1 | 8/2005 |
| GB | 826228 | 11/1955 |
| GB | 826 228 A | 12/1959 |
| GB | 88 05 356.3 | 4/1988 |

* cited by examiner

POSITIONING SYSTEM FOR A COMPONENT, ADJUSTMENT TOOL AND ADJUSTMENT METHOD

TECHNICAL DOMAIN

The invention relates to a system for positioning a component on a frame relative to a reference, a tool for adjusting the position of this component and a method for adjusting the position of three vee assemblies and three ball assemblies.

STATE OF PRIOR ART

It is known that active statically determinate systems, in other words systems that can be manipulated by precise mechanisms such as simple sliding stages fitted with fine pitch worm screws can be used to position optical components.

The most commonly used of these active systems is the LPP (Line, Point, Plane) because it is very easy to use. These systems are often made with three ball elements, the balls of which are also adjustable. In devices of this type, there is one adjustment mechanism for each component to be positioned. Once adjusted, the mechanisms are no longer used and the active devices then only perform a connecting function.

This is a minor disadvantage if there are only a few components. On the other hand, the cost is considerably increased if there is a large number of components to be adjusted.

PRESENTATION OF THE INVENTION

The purpose of this invention is a positioning system, an adjustment tool and an adjustment method to overcome these disadvantages by providing a system that does not in any way reduce the adjustment precision while remaining inexpensive.

The positioning system is characterized by:
  a ball assembly composed of a rod, a ball fixed to the rod and a ball joint clamping system mounted on the rod to fix the ball assembly relative to the component;
  a vee assembly composed of a rod, a vee fixed to the rod and a ball joint clamping system mounted on the rod to fix the vee assembly relative to a frame;
  an elastic connecting element to keep the ball in contact with the vee.

Advantageously, the ball joint clamping system is composed of two concave spherical washers, two convex spherical washers and two nuts to clamp the concave washers and convex washers to each other.

The connecting element may be a threaded coupling bell. As an example, the component is an optical laser component.

The tool used to adjust the position of a component is characterized by the fact that it comprises firstly a frame fitted around the component, and secondly a removable bottom plate that may be fixed to the frame when the component is placed in the frame, the frame and the bottom plate comprising micrometric adjustment screws to displace the component precisely relative to the tooling, the frame and the bottom plate comprising clamping screws used to fix the component in position relative to the tooling once a required position has been obtained.

According to the method of adjusting the position of three vee assemblies:
  a master component is installed fitted with three assemblies provided with cylinders in a tooling according to the invention, each assembly provided with a cylinder comprising a rod and a cylinder fixed to the rod, the diameter of the cylinder being equal to the diameter of a ball forming part of a ball assembly according to the invention, the rods of these clamping systems being clamped onto the master component by a ball joint clamping system (of the concave, convex type), each of the three vee assemblies for which the position is to be adjusted being mounted on a cylinder of the assemblies provided with cylinders through a connecting element;
  the clamps are pre-centred on the cross pieces using the pre-centring tooling;
  the clamps are fixed;
  the pre-centring tooling is removed;
  the rods of the vee assemblies are mounted in three through holes formed in the pod and the adjustment tooling is clamped on the pod;
  the position of the master component is adjusted relative to a reference, using the adjustment tooling;
  when the master component is in the required position relative to the reference, each of the three vee assemblies is clamped in the position that it occupies using its ball joint clamping system;
  the pod adjustment tooling is released and disassembled from the master component.

According to the method of adjusting the position of the three ball assemblies:
  the position of the three vee assemblies relative to an adjustment bench is adjusted using a master component and the method described above;
  the component is fitted with three ball assemblies for which the position is to be adjusted and it is mounted in an adjustment tooling according to the invention;
  the clamps are pre-centred;
  the pre-centring tooling is removed;
  the balls are brought into contact in the vees adjusted using the master component and the adjustment tooling is clamped on the adjustment bench;
  the position of the component relative to a reference is adjusted using the adjustment tooling;
  when the component is in the required position relative to the reference, each of the three ball assemblies is clamped in the position that it occupies using its ball joint clamping system;
  the locking bells are released;
  the adjustment tooling of the adjustment bench is loosened and disassembled from the component;
  the component is put into place on the pod.

Once the component has been adjusted on the bench, it may be positioned on the vees of the pod without changing their position because the vee assemblies of the pod were adjusted in the same way as the vee assemblies of the bench using the same master component. This guarantees interchangeability of the components.

BRIEF DESCRIPTION OF THE DRAWINGS

Other characteristics and advantages of the invention will become clear after reading the following description of an example embodiment given as an illustration with reference to the appended figures.

On these figures.

DETAILED PRESENTATION OF PARTICULAR EMBODIMENTS

Figure 1:
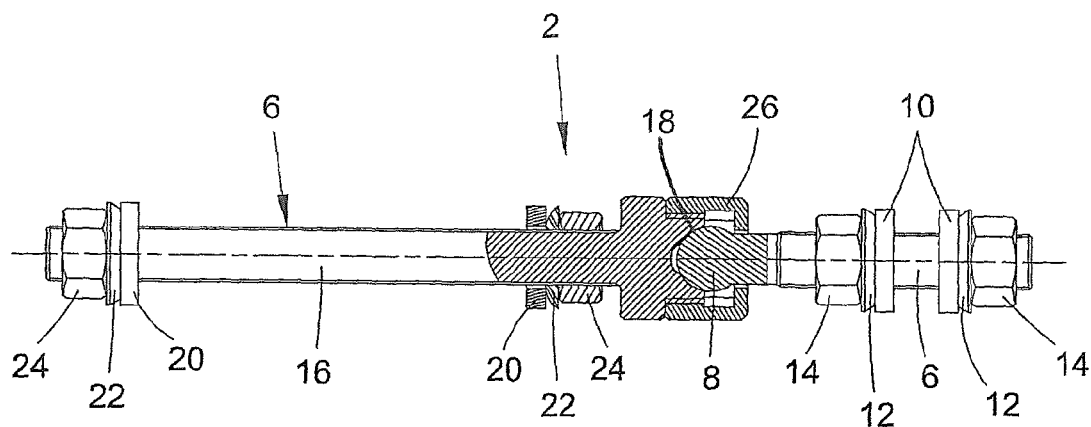
FIG. 1 is a sectional view of a positioning system of the component conforming with the invention.
Figure 2:
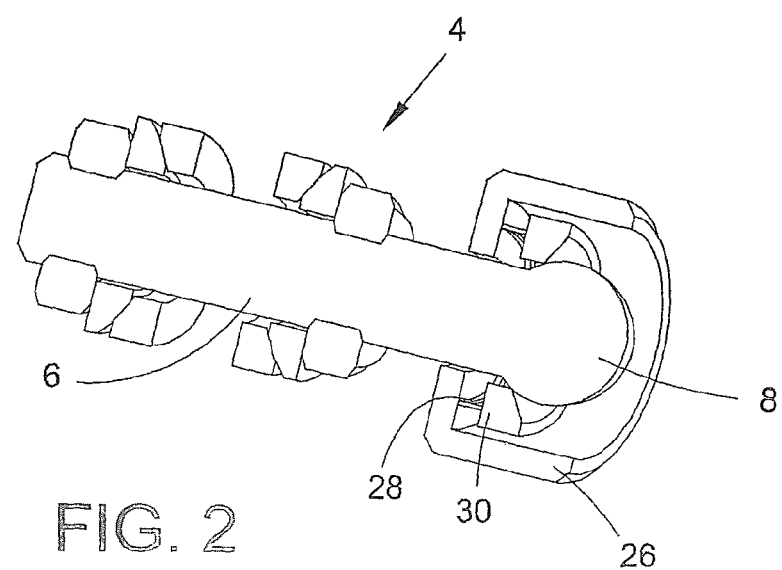
FIG. 2 is a three-dimensional view of the ball assembly forming part of the positioning system in FIG. 1.

In FIG. 1, the positioning system for a component according to the invention denoted by the general reference 2, comprises firstly a ball assembly 4 and a vee assembly 6. The ball assembly 4 shown in more detail in FIG. 2, comprises a ball interface composed of a rod 6 and a ball 8 fixed to the rod. For example, the rod diameter may be 12 mm and the ball diameter may be 15 mm. A ball joint clamping system is mounted on the rod 6 to fix the ball assembly in position relative to a component that is to be positioned relative to a reference. In the example shown, the ball joint clamping system is composed of two concave spherical washers 10, two convex spherical washers 12 and two nuts 14. The component is clamped between two concave washers 10.

Similarly, the vee assembly 6 is composed of a vee interface comprising a rod 16 fixed to a vee 18. A ball joint type clamping system is mounted on the rod 16 to fix the vee assembly relative to a frame. In the example shown, the ball joint clamping system is identical to the ball assembly system. It is composed similarly of two concave spherical washers 20, two convex spherical washers 22 and two nuts 24. The frame is inserted between the two concave spherical washers 20.

The ball 8 in the ball assembly 4 is fixed in position in the vee 18 of the vee assembly 6. The ball and the vee are kept in contact with each other by means of a connecting element, for example a threaded coupling bell 26. In order to avoid any pre-stress in the connection of the ball and the vee, a spring or an elastic washer 28 is installed under a contact washer 30 so as to keep the ball in place elastically in the vee.

Figure 3:
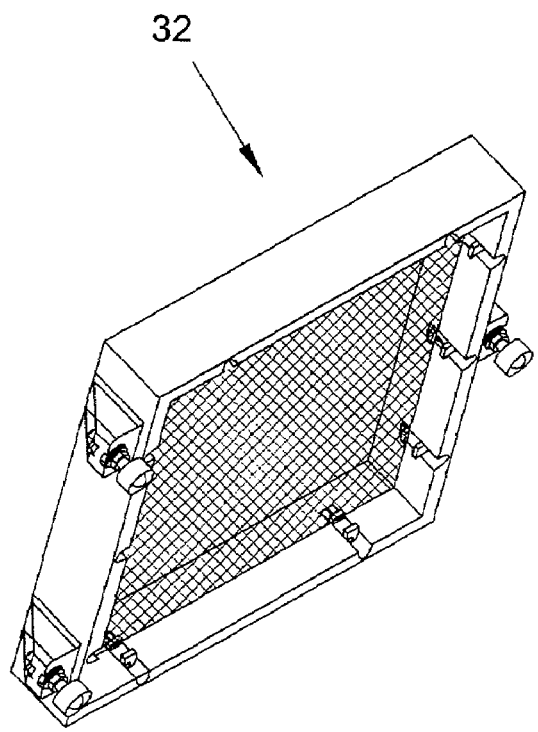
FIGS. 3 and 4 are a rear view and a front view respectively of an optical component fitted with three ball assemblies as shown in FIG. 2.
Figure 4:
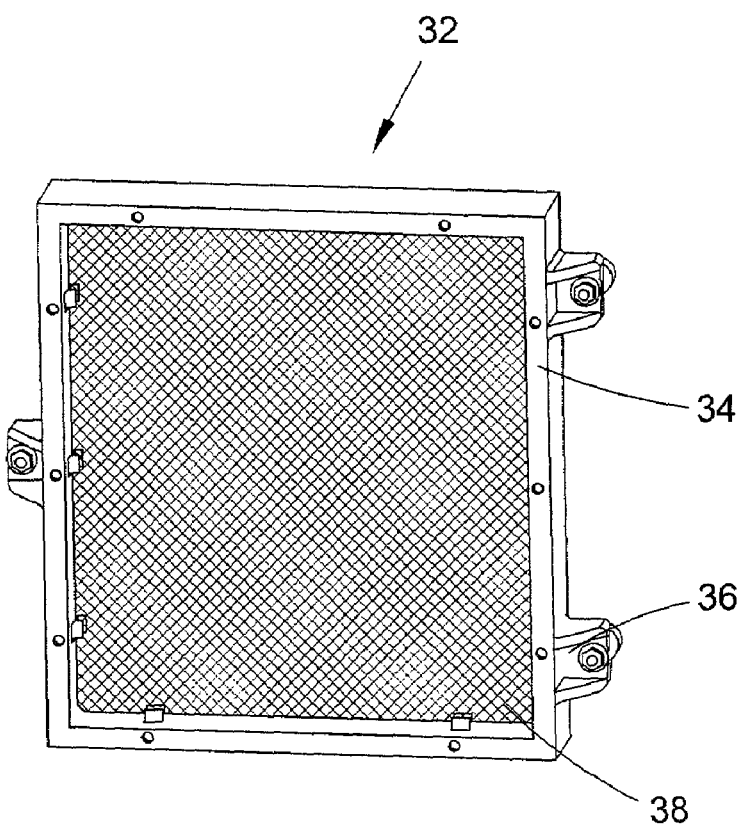

FIGS. 3 and 4 show the optical component to be positioned, denoted as a whole by reference 32, composed of a frame 34 comprising three lugs 36. An optical element 38 is fixed in the mounting 34. Each of the lugs 36 is perforated by a through hole. The rod 6 of the ball assembly 4 is inserted in this through hole and the lug is clamped between the two concave washers 10 of the ball joint clamping system in order to hold the ball assembly in position relative to the component 32.

Figure 5:
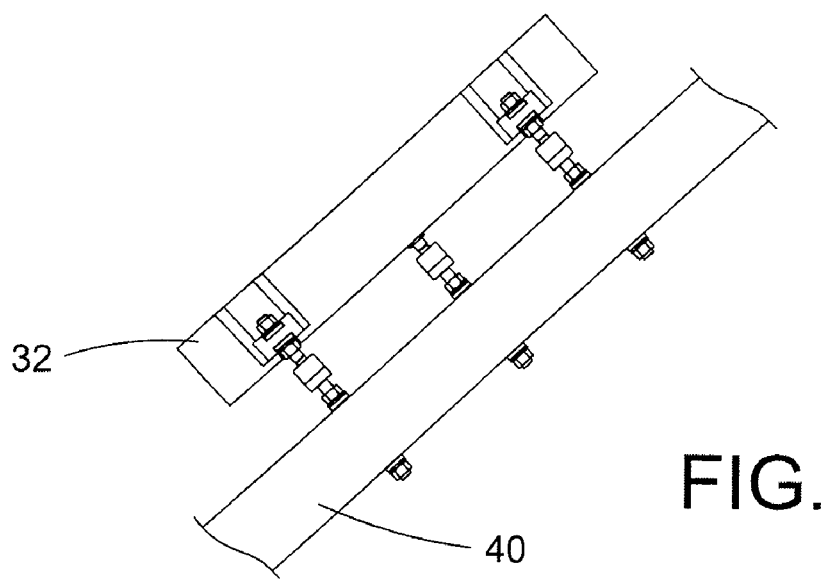
FIG. 5 is a side view of the optical component in FIGS. 3 and 4 mounted on the cross pieces of a pod using the positioning system shown in FIG. 1.

In FIG. 5, the component 32 is mounted on parallel cross pieces 40 (only one cross piece can be seen in FIG. 5) of a pod making a frame by means of the complete positioning system. Two vee assemblies were mounted on a cross piece and a third vee assembly was mounted on a parallel cross piece. In the same way as for component 32, through holes are provided in the cross pieces 40 of the pod. The rod 16 in each of the vee assemblies 6 is inserted in one of these through holes and the vee assembly is held in place relative to the cross piece by means of the ball joint clamping system, in the same way as above by screwing the nuts 24 into place so as to clamp the concave washers 20 onto the cross piece. Advantageously, an insert can be placed in the cross piece to prevent crushing and to make the assembly more rigid.

Considering that the diameter of the holes provided in the lugs 36 of the component 32 and the holes provided in the cross piece 40 of the pod is larger than the diameter of rods 6 and 16, each rod can pivot by a few degrees, for example plus or minus 3°, relative to the component or relative to the pod. Therefore each rod 6 or 16 has 6 degrees of freedom.

Figure 6:
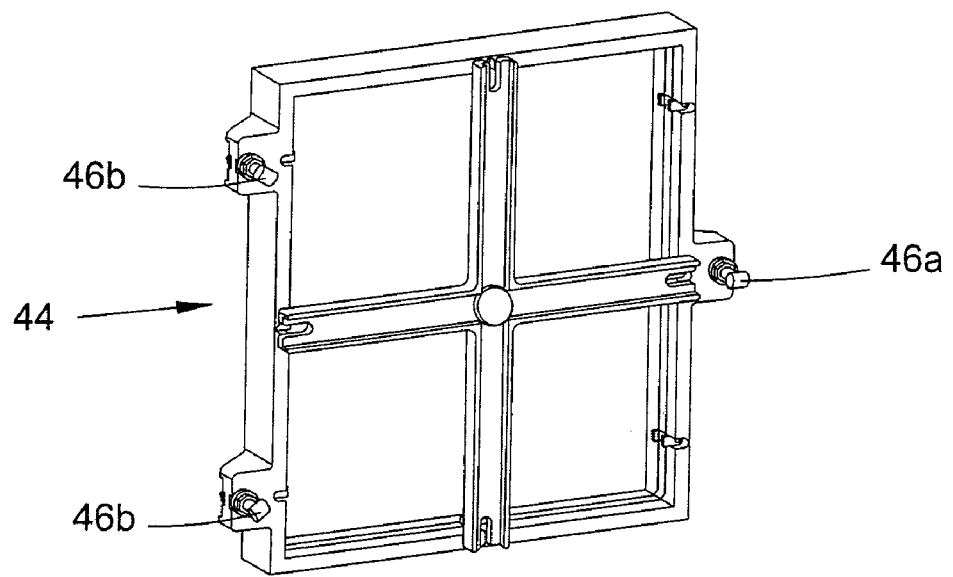
FIG. 6 is a three-dimensional view of a master component fitted with three assemblies provided with cylinders.

FIG. 6 shows a perspective view of the master component 44. This component plays an essential role in the method according to the invention because it is unique and because once it has been created, it is used to adjust all of the vee interfaces.

The fact that there is only one master component eliminates a number of tolerances because the same defects are reproduced on all components and consequently these defects cancel each other out.

Figure 7:
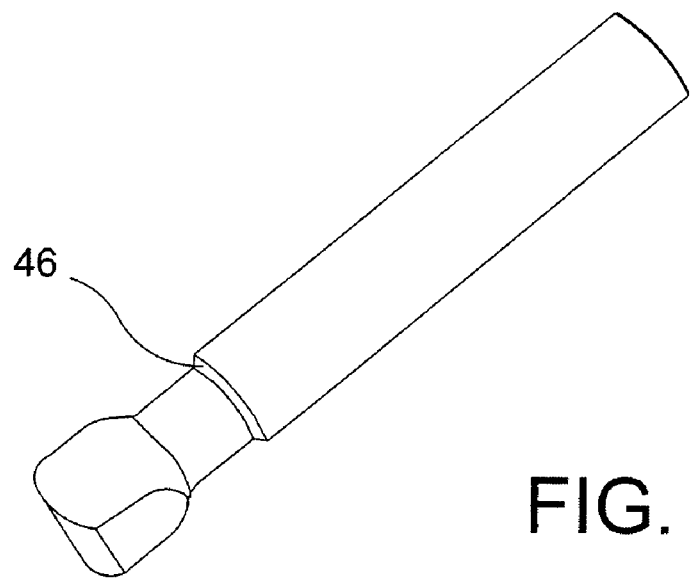
FIG. 7 is a detailed view of the cylinder interface of the master component shown in FIG. 6.

The master component is similar to the optical component 32 in FIGS. 3 and 4, except for the fact that the ball assembly is replaced by an assembly provided with a cylinder (see FIG. 7). The cylinders are used to orient the vees so that they are all in the same direction as the master. For example, the cylinder 46a has a horizontal axis, the cylinder 46b has an axis pointing downwards at a certain inclination (for example 45°) and the cylinder 46c has an axis pointing upwards at a certain inclination, for example also 45° (as shown in FIG. 6). In this way, the axes of the cylinders 46a, 46b and 46c are concurrent at the centre of the element such that the edges of the vees will also be concurrent later on at the time of the adjustment.

Furthermore, what characterizes the master component above all is that it necessarily has to be created in an absolute rather than a relative manner. The reproduction quality of a master component is of overriding importance because if it breaks, there is no need to adjust all of the Line Line Line interfaces again, which would be unacceptable in terms of maintenance.

An adjustment bench is necessary for adjustment of the master component. Different methods can be used to make this adjustment. Firstly, the optical element of the master component can be used for an adjustment in self-collimation to achieve parallelism with the mask used as a reference on the bench (adjustment of the inclination along two concurrent XY axes). The optical element may have lines etched vertically and horizontally so as to achieve centring. These lines may also be used for adjustment of the separation relative to the mask by comparing the movement of the cross hair of a theodolite that may or may not indicate a parasite tilt along the z axis. Finally, the telemetry function of the theodolite will be used to measure the separation along the z axis. Part of the optical element will be metallised around the optical centre so to obtain sufficient reflected flux on the objective. A mirror could also be used.

Figure 8:
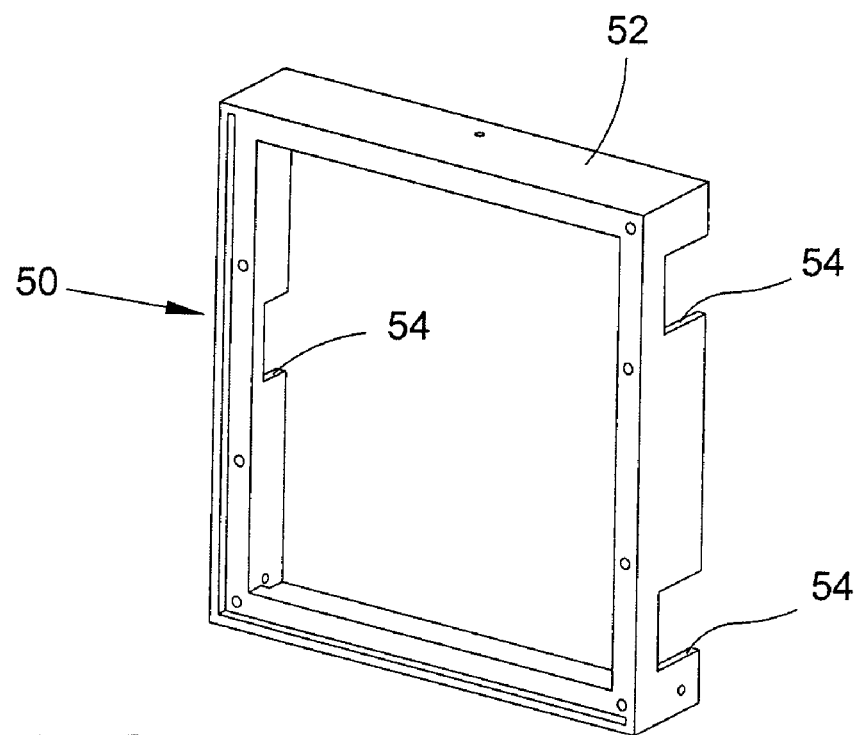
FIGS. 8 and 9 respectively show a view of the frame and a view of the bottom plate of the LLL adjustment tooling.
Figure 9:
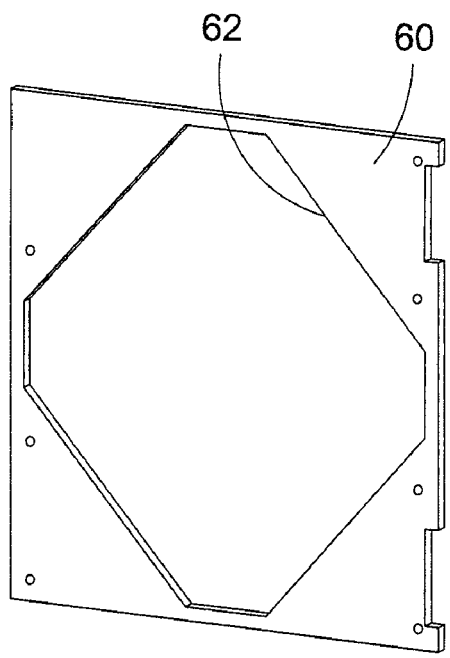

FIG. 8 shows a main part of the tooling 50. It is composed of a frame that adapts around the component, for example the component shown in FIGS. 3 and 4 or the master component shown in FIG. 6. The frame comprises four sides, including two opposite sides with recesses formed in them to allow the passage of the lugs 36 of the components. The bottom plate 60 shown in FIG. 9 may be adapted onto the frame 50 and fixed by screws. It has an octagonal shaped recess 62 comprising four large sides and four small sides.

Figure 10:
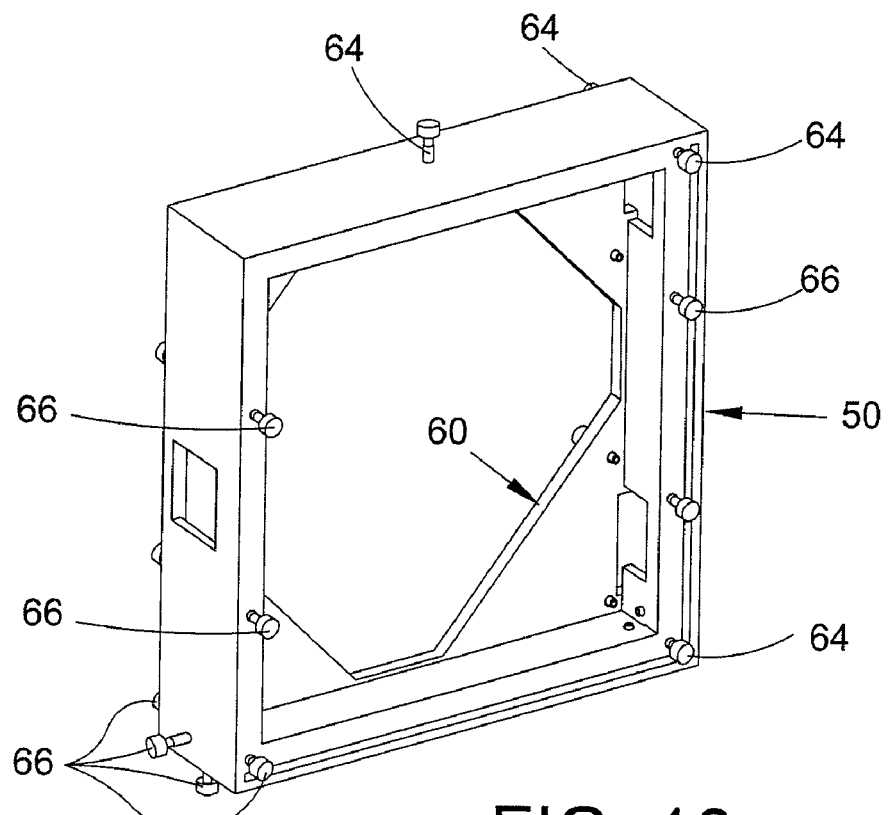
FIG. 10 is a view of the LLL adjusting tooling shown in FIGS. 8 and 9 assembled empty.

FIG. 10 shows the bottom plate 60 assembled to the frame 50. The frame comprises micrometric adjustment screws 64 used to adjust the position of the component when it is inside the frame. In the example, the adjustment screws are of the Norelem or Newport type. The frame also comprises clamping screws 66 that hold the component in position relative to the frame after adjustment. The screws 66 are preferably swivel headed screws.

Figure 11:
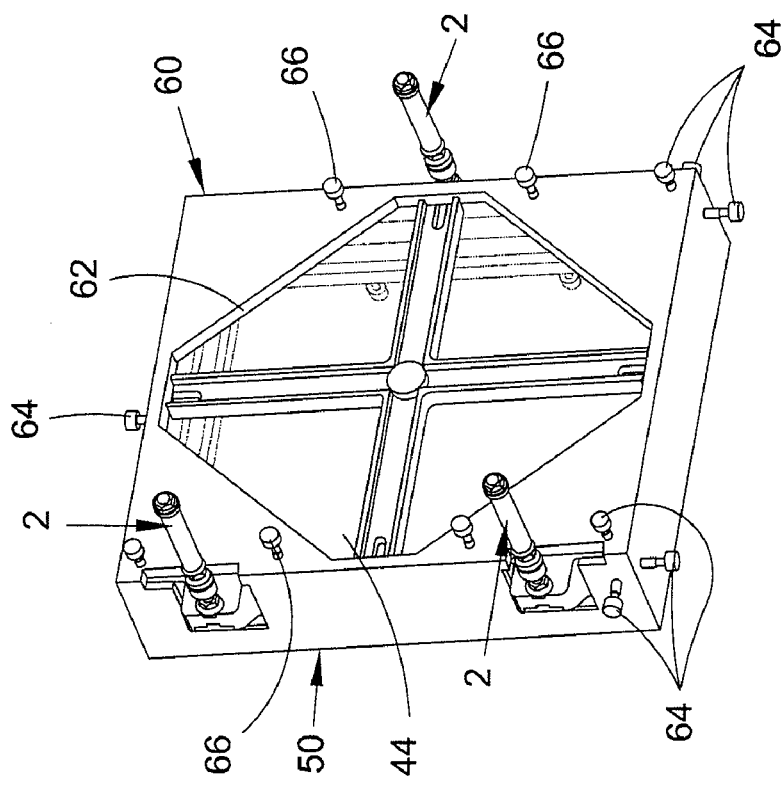
FIG. 11 is a back view of the LLL adjustment tooling containing the master component in FIG. 6.

FIG. 11 shows the master component 44 mounted inside the adjustment tooling. On this figure, the master component 44 is fitted with complete positioning systems, in other words comprising ball assemblies and vee assemblies fixed to each other by coupling bells.

In the same way as for the master component, the adjustment tooling shown in FIGS. 8 to 11 is unique. The same adjustment tooling is used for all components. All adjustment functions are performed by this tooling such that the components only perform a passive role. Similarly, the tooling is fixed onto a frame, for example a pod by means of joint clamps 70. Consequently, a single set of clamps is sufficient. The clamps are adjusted by means of a pre-centring tool 72. The clamps 70, for example three in number, are fitted on the pre-centring tool 70 by means of screws. The tooling comprises at least two pre-centring rods 74 that are positioned in two of the three holes formed in the frame and designed for subsequent reception of the rods 16 of the vee assembly. In this way, the pre-centring tool is located approximately in the position in which the tooling is to be placed. In this position, the clamps are tightened on the cross pieces 40 of the pod so as to fix them in place. The pre-centring plate 72 is then removed and the tooling is fixed at its position.

Figure 13:
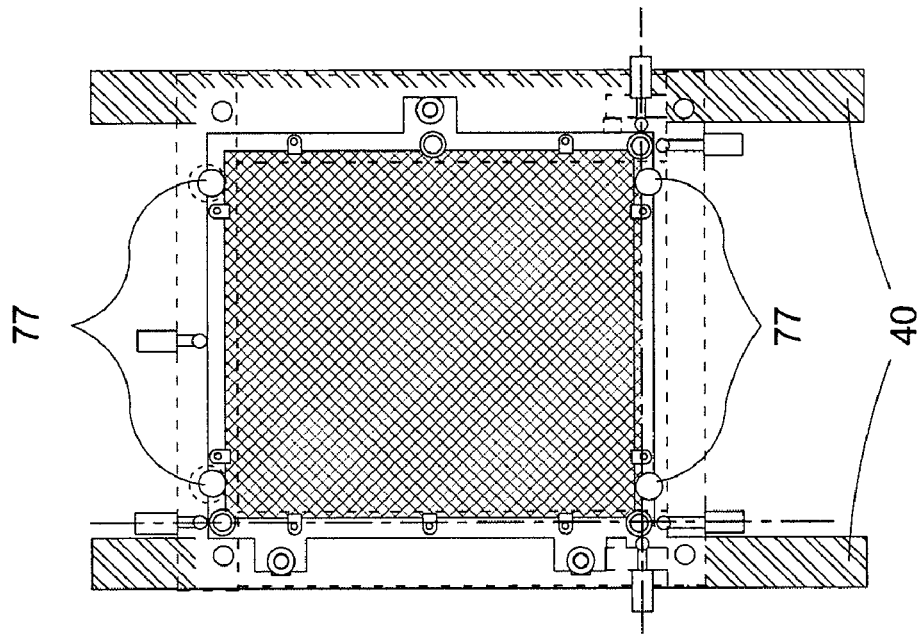
FIGS. 13 and 14 respectively show a side view and a front view of the tooling in FIG. 11 mounted on the cross-pieces of a pod.
Figure 14:
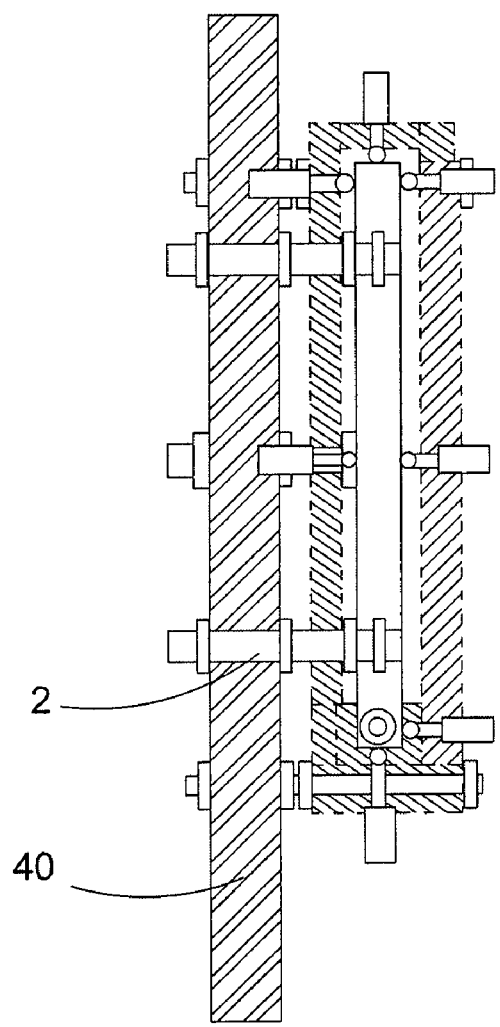

FIGS. 13 and 14 show a front view and a side view respectively of the tooling comprising the master component fitted on the cross pieces 40 of a pod.

Reference 77 denotes the sights that are mounted on the master component in order to adjust its position relative to a reference as will be described later. Mirrors or cubic wedges or reflectors could also be used.

Figure 15:
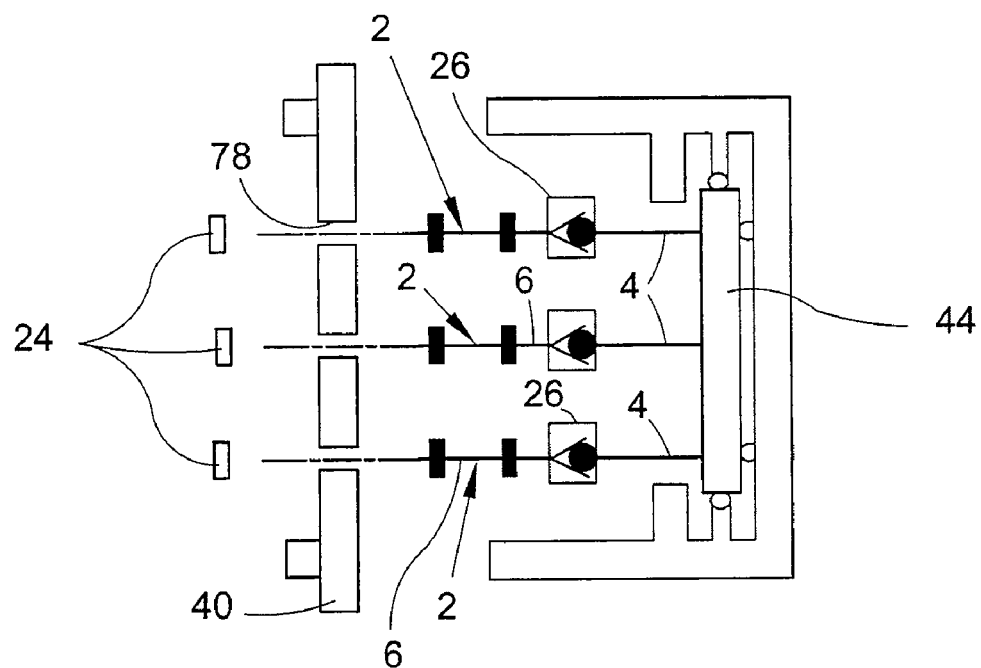
FIGS. 15 to 20 are diagrams that illustrate the successive steps in the adjustment of a Line Line Line (LLL) assembly using the master component in 6.

The different steps in adjustment of the position of the three vee assemblies 6 according to the method described in the invention will now be described in detail with reference to FIGS. 15 to 20. In FIG. 15, after firstly performing the clamp pre-centring phase, the master component 44 is mounted inside the adjustment tooling, as shown in FIG. 11. In this position, it is fitted with three positioning systems 2 conforming with the invention, each composed of an assembly provided with a cylinder and a vee assembly connected to each other through a coupling bell 26. The nut 24 at the end of the rod 16 and the concave and convex washers associated with this nut are removed so that the rods 16 can be inserted in the holes 78 formed in the pod. In FIG. 15, the three holes are shown aligned to simplify the display, but it is obvious that in fact two holes are formed on one cross piece and a third hole is formed on a parallel cross piece such that the holes 78 are not aligned.

Figure 12:
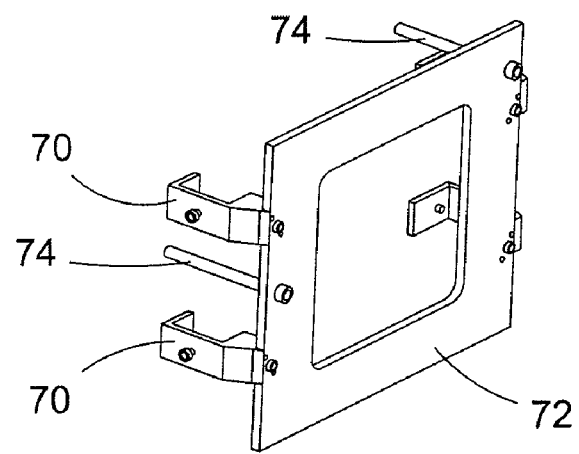
FIG. 12 is a perspective view of a clamp pre-centring tooling.
Figure 16:
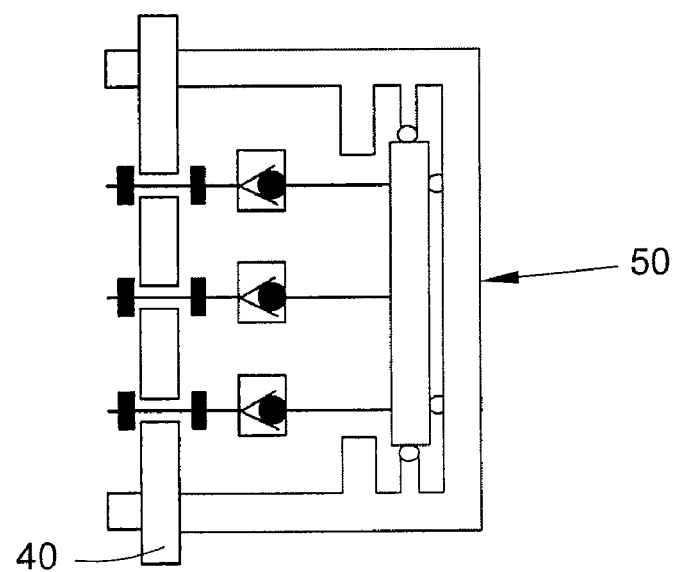

In FIG. 16, after the rods 16 have been inserted in the holes 78, the concave washer 20 and the convex washer 22 that had been removed are put back into position followed by the nut 24 (without tightening it), and the adjustment tooling 50 is clamped on the cross piece 40 using clamps 70, the operation of which was described with reference to FIG. 12.

Figure 17:
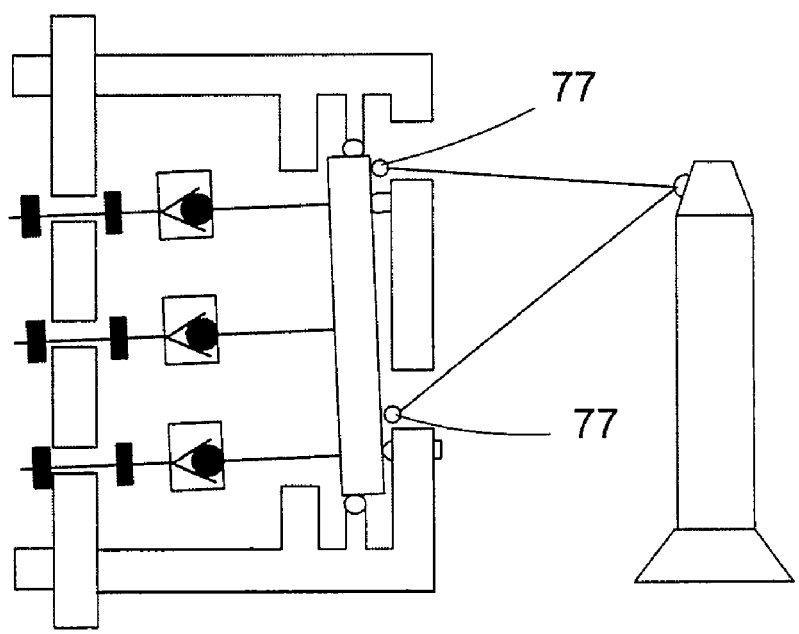
Figure 18:
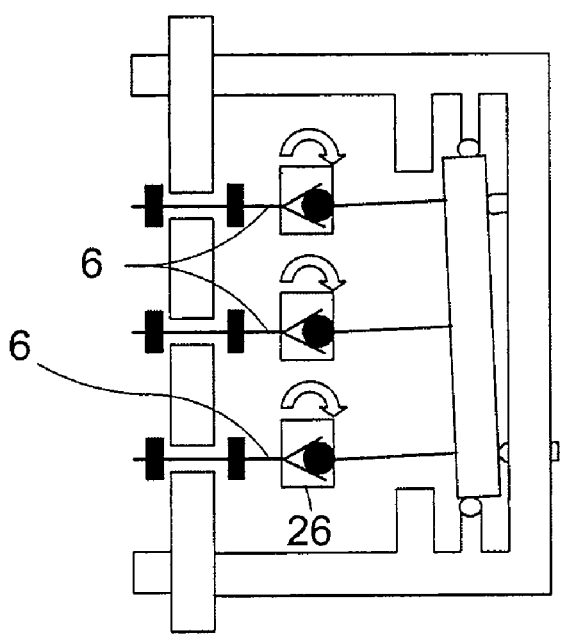
Figure 19:
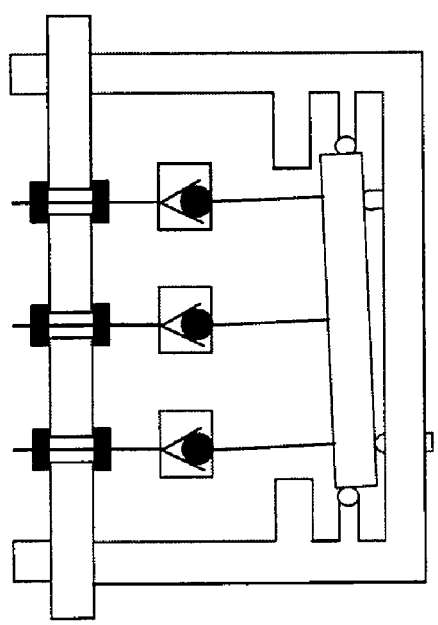

In FIG. 17, the position of the master component 44 is adjusted by means of the adjustment screws relative to a reference, for example by means of a tracker or a theodolite.

Figure 20:
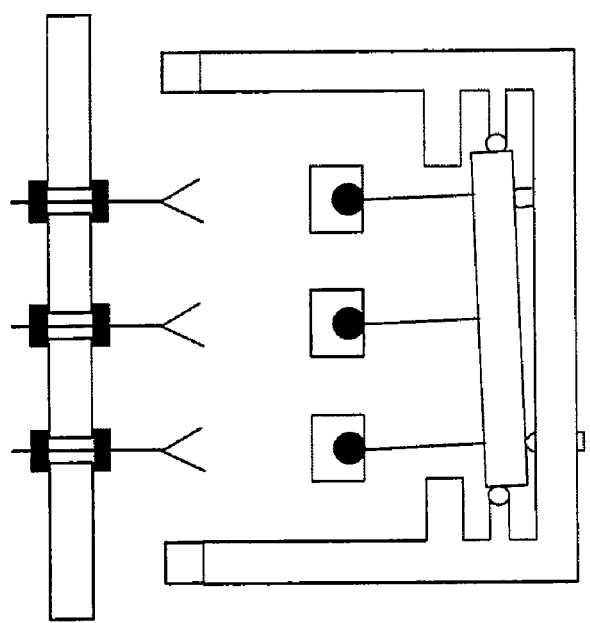

The position of the master component is adjusted by means of the sights 77. It is then sufficient to fix them in this position by means of the locking screws so that the adjustment operation is terminated. The first step to achieve this is to tighten the connecting element 26 to hold the cylinder in position applied on the vee and the clamping system is then tightened on each side of the cross piece 40 of the pod. At this stage, it is important to clamp the two nuts 24 in a balanced manner so as not to cause displacement of the rod 16 relative to the adjusted position occupied by it. Since the rods 16 were locked in position, the adjustment operation of the vees is terminated and all that is necessary is to remove the adjustment tooling and the master component. This is done by separating the coupling bells 26, and releasing and removing the tooling (FIG. 20).

When these operations have been completed, the tooling is available for a new adjustment operation. Thus, a large number of vee assemblies can be adjusted in sequence using the same tooling, the same master component and the same clamps.

All that is necessary when all vee assemblies have been adjusted is to adjust the optical components. This operation may be done in a rear station, in other words in a metrology workshop such that the components are all adjusted before they are brought onto the site.

The first step to perform this operation is to create a master vee assembly by means of the master component on a bench using the method that has just been described with reference to FIGS. 15 to 20. Each component to be positioned is fitted with three ball assemblies for which the position is to be adjusted and this component is mounted in an adjustment tooling exactly as was done for the master component. The tooling or the adjustment bench are clamped and each of the balls is brought into contact with one of the master assembly vees. The method used to adjust the position of the component relative to the reference is also used to adjust the master component to this reference, for example by means of a tracker or a theodolite. This is done by displacing the component relative to the adjustment tooling using adjustment screws when the component is in the required position relative to the reference, the ball assemblies are in the required position and all that is necessary is to clamp them in the position that they occupy by clamping the ball joint clamping system mounted on the rod 6. In the same way as for the vee assemblies, it is important to clamp the nuts 14 in a balanced manner so as not to modify the position of the rods. The position of the ball assemblies relative to the component is then fixed and all that remains to be done is to disassemble the adjustment tooling. To achieve this, it is released from the adjustment bench and removed from the component. The balls in the ball assemblies of the component are separated from the vees of the master vee assembly of the adjustment bench. The adjustment tooling and the master vee assembly are then available to adjust another component. Thus, all components can be adjusted. Once a component has been adjusted on the bench, it can be positioned on the pod without using any adjustment tooling because the line interfaces were adjusted on the adjustment bench in the same manner as the master component on the pod using this master component. This guarantees interchangeability of the components. Any component may be placed on any of the pod vee assemblies.

In the example that has just been described, the vee assemblies are on the pod, while the ball assemblies are on the component. However, this arrangement is obviously not essential, and it would be possible to have the ball assemblies on the pod and the vee assemblies on the component, without making any change to the method and the device according to the invention.

The invention claimed is:

1. System for positioning a component on a frame to which a plurality of lugs is connected with each lug perforated by a through hole, relative to a reference, comprising:
    first and second parallel cross pieces having through holes therein;
    three ball assemblies, each composed of a rod (6), a ball (8) fixed to the rod (6) and a ball joint clamping system (10, 12) mounted on the rod to fix the ball assembly relative to the component;
    three vee assemblies each composed of a rod (16), a vee (18) fixed to the rod (16) and a ball joint clamping system (20, 22) mounted on the rod to fix each of the vee assemblies relative to the frame;
    three elastic connecting elements (26) to keep the balls (8) in each of the three ball assemblies in contact with the vees (18) in each of the three vee assemblies respectively;
    wherein two of said three vee assemblies are mounted on the first cross piece and the third vee assembly mounted on the second cross piece in an arrangement with the rod in each of the vee assemblies inserted through one of the through holes in the cross pieces and with each vee assembly held in place relative to the cross piece upon which it is mounted using the ball joint clamping system; and
    wherein the three ball assemblies are mounted upon the lugs of the frame with each of the rods in the ball assemblies inserted through a through hole in the lugs of the frame and with the ball assemblies held in place relative to the frame using the ball joint clamping system.

2. Positioning system according to claim 1, characterised in that the ball joint clamping system is a spherical joint composed of two concave spherical washers (10), two convex spherical washers (12) and two nuts (14) to clamp the concave washers and convex washers to each other with the convex washers being slidably fitted inside the concave washers.

3. Positioning system according to claim 1 or 2, characterised in that the connecting element is a threaded coupling bell (26).

4. Positioning system according to claim 1 or 2, characterised in that the component is an optical laser component.

5. Adjustment tooling for positioning a component, characterized in that said adjustment tooling comprises firstly a frame (50) having four sides that adapts around the component, and secondly a removable bottom plate (60) adapted to be fixed to the frame (50) when the component (32, 44) is placed in the frame using a joint clamp, and at least two vee assemblies mounted on cross pieces upon which the component is mounted with the vee assemblies held in place relative to the cross pieces using a ball joint clamping system and with the component being precisely adjusted relative to the tooling, the frame and the bottom plate using micrometric adjustment screws and clamping screws (66) with the clamping screws used to fix the component in position relative to the tooling once a required position has been obtained.

6. Adjustment method for positioning said three vee assemblies according to claim 1 or 2 relative to a pod, comprising the steps of:
    installing a master component (44) fitted with the three vee assemblies provided with cylinders using an adjustment tooling (50,60) as defined in claim 5, each assembly provided with a cylinder comprising a rod with the cylinder fixed to the rod, the diameter of the cylinder being equal to the diameter of a ball forming part of a ball assembly composed of a rod (6), a ball (8) fixed to the rod (6) and a ball joint clamping system (10, 12) mounted on the rod to fix the ball assembly in position relative to the component, and with the rods clamped onto the master component by a ball joint clamping system such that each of the three vee assemblies for which the position is to be adjusted is mounted on a cylinder of the assemblies through a connecting element;
    mounting the rods of the vee assemblies in three holes (78) in the pod (40) with the adjustment tooling (50, 60) clamped on the pod;
    adjusting the position of the master component (44) relative to a reference, using the adjustment tooling (50, 60); and
    clamping each of the three vee assemblies using its ball joint clamping system when the master component (44) is adjusted into position relative to the reference;
    whereby the pod adjustment tooling (50, 60) is released and disassembled from the master component.

7. Method for adjusting the position of three ball assemblies relative to a component (34) using the method of claim 6 and the adjustment tooling of claim 5 comprising the steps of :
    adjusting the position of the three vee assemblies relative to an adjustment bench;
    fitting the component (34) with the three ball assemblies;
    bringing the balls into contact in the vees with the adjustment tooling (50, 60) clamped on the adjustment bench;
    adjusting the position of the component relative to a reference using the adjustment tooling;
    clamping each of the three ball assemblies into position using the ball joint clamping system when the component is aligned into the required position relative to the reference ;
    loosening and disassembling the adjustment tooling, (50, 60) from the component; and
    putting the component into place on the pod.

* * * * *